United States Patent [19]
Moh et al.

[11] Patent Number: 6,023,732
[45] Date of Patent: Feb. 8, 2000

[54] MESSAGE TRANSFER APPARATUS FOR CONTROLLING A MESSAGE SEND IN A PACKET SWITCHED INTERCONNECTION NETWORK

[75] Inventors: Sang Man Moh; Sang Seok Shin; Suk Han Yoon; Kee Wook Rim, all of Daejon-Shi, Rep. of Korea

[73] Assignee: Electronics and Teleconnunications Research Institute, Taejon-shi, Rep. of Korea

[21] Appl. No.: 08/899,957

[22] Filed: Jul. 24, 1997

[30] Foreign Application Priority Data

Jul. 24, 1996 [KR] Rep. of Korea ...................... 96-29904

[51] Int. Cl.[7] .............................. H04L 12/00; G06F 15/16
[52] U.S. Cl. .......................... 709/232; 709/237; 370/282; 370/299; 370/389
[58] Field of Search .......................... 395/200.8, 200.62, 395/200.67; 370/363, 282, 299, 389; 709/232, 237

[56] References Cited

U.S. PATENT DOCUMENTS

| | | | |
|---|---|---|---|
| 4,672,570 | 6/1987 | Benken | 395/200.8 |
| 5,261,059 | 11/1993 | Hedberg et al. | 395/312 |
| 5,623,606 | 4/1997 | Yokoyama et al. | 395/200.62 |
| 5,675,737 | 10/1997 | Horie et al. | 395/200.07 |
| 5,727,149 | 3/1998 | Hirata et al. | 395/200.8 |
| 5,745,790 | 4/1998 | Oskouy | 395/853 |
| 5,751,951 | 5/1998 | Osborne et al. | 395/200.8 |
| 5,751,952 | 5/1998 | Dai et al. | 395/200.8 |
| 5,771,356 | 6/1998 | Leger et al. | 395/200.63 |
| 5,790,530 | 8/1998 | Moh et al. | 370/363 |

*Primary Examiner*—Krisna Lim
*Attorney, Agent, or Firm*—Cohen, Pontani, Lieberman & Pavane

[57] ABSTRACT

The present invention relates to a message-passing computer system and a packet-switched interconnection network. The message transfer apparatus in a packet-switched interconnection network includes a message send controller controlling a send procedure in which messages requested by a processor are sent via an output port, and a timer enabled by an output signal of the message send controller and generating a timeout signal. A buffer unit is connected to the message send controller and is composed of a message buffer having four buffers and a data buffer. A local bus controller connects the message send controller and the buffer unit to the local bus and controls a transfer request and a transfer response to the local bus. An output port controller connected to both the message send controller and the buffer unit controls the output port which sends a packet to an interconnection network.

3 Claims, 7 Drawing Sheets

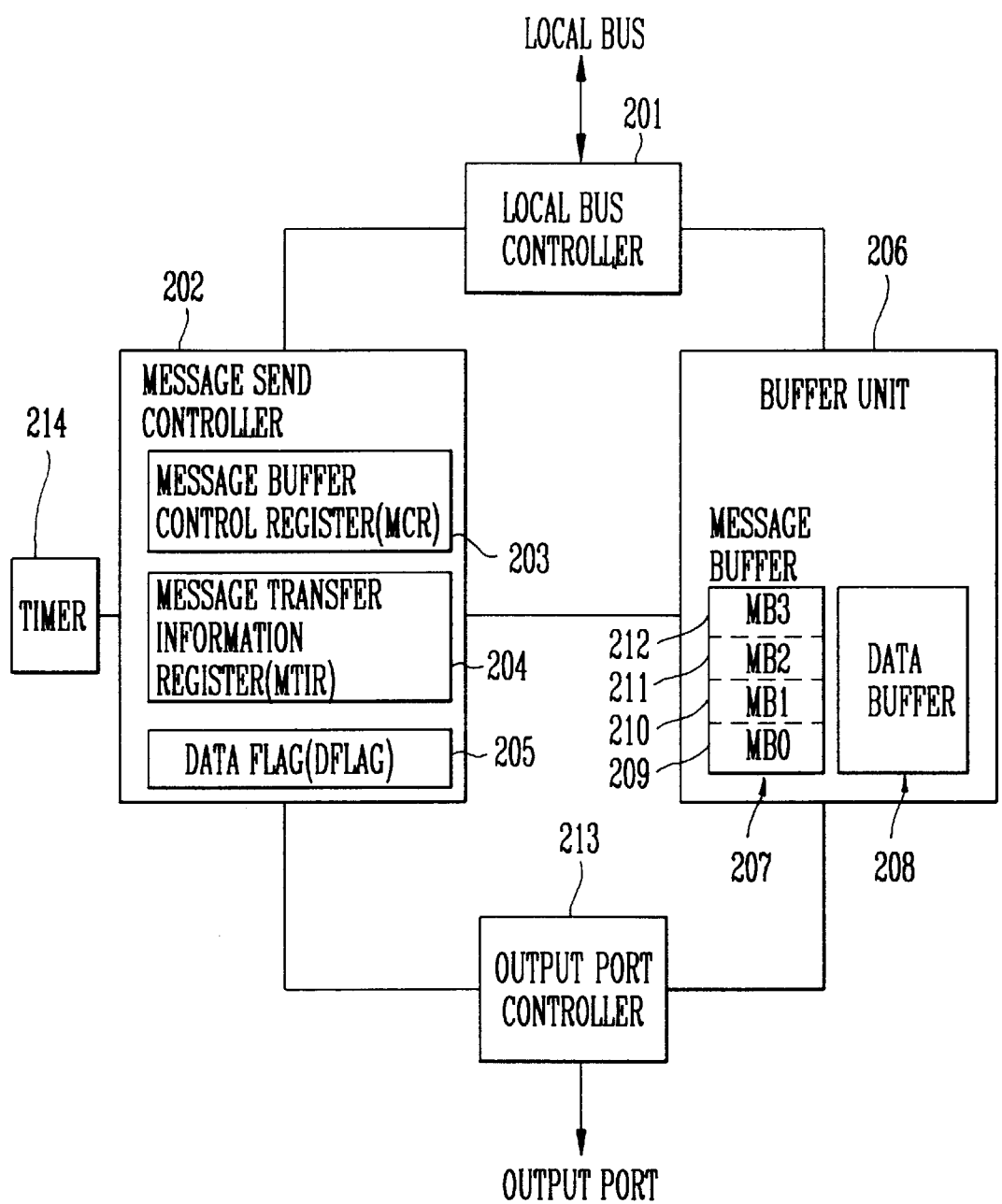

MESSAGE TRANSFER APPARATUS FOR CONTROLLING A MESSAGE SEND IN A PACKET SWITCHED INTERCONNECTION NETWORK

FIELD OF THE INVENTION

The present invention relates to a message-passing computer system and a packet-switched interconnection network. More particularly it relates to a node-to-node message transfer via a packet-switched interconnection network in a message-passing computer system. And, the details of the present invention is related to a message send controller for performing a node-to-node message transfer via a packet-switched interconnection network in a message-passing parallel computer system of message send type.

BACKGROUND OF THE INVENTION

In general, a message-passing computer system is a parallel computer system in which a plurality of nodes operate cooperatively each other by interchanging messages through an interconnection network. As each node in the message-passing computer system receives and sends messages via the interconnection network, the latency and bandwidth of the message are important design considerations which affect the performance of the message-passing computer system.

Various topologies in interconnection networks have been developed and designed actively from various design points, and the interconnection network is effectively used not only in the message-passing computer systems but also in shared-memory multiprocessor computers. A network interface, a hardware apparatus for functioning as a bridge to connect a node to an interconnection network, must be designed to perform a function to receive and send messages to an interconnection network, minimize the latency of message and maximize the bandwidth of message.

A crossbar interface for a data communication network was developed by W. F. Hedberg, et al. in Digital Equipment Corporation. It is known from U.S. Pat. No. 5,261,059. The mentioned invention is concerned with an interface between the host computer and the crossbar switch and is designed to provide data buffering using an RAM device. A receive and send data are stored in or read from an RAM via a separated individual serial port. At the same time a local processor located within the crossbar interface can make an access to the RAM via a parallel port asynchronously with the serial port.

In the above invention, the local processor is the subject to perform a transfer protocol and a transmit controller neighboring the crossbar swith acts as some part of function to transmit data directly. In the invention, a data transmit interface and a data receive interface are designed to be integrated into one, the local processor controls an overall data receive and send and buffer management, the transmit controller functions to transmit data directly to the crossbar switch, and the receive controller functions to receive data directly from the crossbar switch. In the invention the local processor controls both the transmittance and the reception by integrating the data transmit interface and the data receive interface. However, in order to maximize the transmit and receive rate, the transmittance must be performed independent of the reception by separating the transmit interface and the receive interface independently.

Also, in the invention the local processor located within the crossbar interface controls the transmittance and reception of the data. Therefore, as the local processor performs a program, there exists a problem in increase of message transfer overhead. However, if all the transmit controls are integrated and performed in a dedicated hardware without using an additional processor, the message overhead can be minimized.

D. S. Henry and C. F. Joerg disclosed a paper about a tightly-coupled processor-network interface. The paper was published in the proceedings of 5th International Conference on Architectural Support of Programming Languages and Operating Systems, pp. 111–122, Boston, Mass., October 1992. According to their analysis, the interface between the processor and the interconnection network must be designed to minimize a software overhead in the communication between nodes.

Most of the network interfaces presently used can be classified into two types; a memory-mapped interface and a Direct Memory Access(called DMA thereinafter)-based interface. A message send in the memory-mapped interface is initiated when the processor executing a program to stores a sending message directly into a buffer located within the network interface and requests to send the message, and the network interface sends immediately the message stored in the buffer. When the message arrives from the interconnection network, the network interface activates an interrupt to the processor to notify the arrival of the message, and the processor begins to read the message stored in the buffer. A processor polling method may be used instead of an interrupt method.

Systems using a memory-mapped interface include MDP Machine, CM-5, MIT Alewife etc. As addresses are allocated to the message buffer to which the processor can make an access, the processor can make an access to the message buffer as it makes an access to the memory.

A message send is initiated when the processor executing a program prepares a sending message in the main memory and then requests the network interface to send the message, and the network interface reads the sending message from the main memory in a DMA transfer method and then sends it to the interconnection network. When a message arrives from the interconnection network, the network interface stores the arrived message into the main memory in a DMA transfer method and then interrupts the processor to notify the arrival of the message. Systems using DMA-based interface include NCUBE, iPSC/2 etc. These systems receive and send the messages through DMA transfer between the main memory and the network interface. The DMA transfer is implemented at a hardware level.

The cited systems support only one of the memory-mapped transfer method and the DMA-based transfer method. However, it is required to support both of the methods for an efficient message transfer. Also, in order to provide the user with flexibility, it is required to have a function that assigns selectively one of the two transfer methods within a software program according to the message characteristics(message location, transfer amount, etc.).

SUMMARY OF THE INVENTION

Accordingly, it is an object of the present invention to provide a message transfer apparatus for controlling a message send in a packet-switched interconnection network, which incorporates a message send controller supporting an efficient message send and a dedicated hardware capable of maximizing a message send rate, taking the structural characteristics of the message-passing parallel computer system of into maximum considerations, thereby minimizing software and hardware overhead in sending a message and being capable of selecting a message send method in accordance with the message characteristics.

For the purpose of accomplishing the object, according to an embodiment of this invention, a message transfer apparatus in a packet-switched interconnection network, comprising; a send controller connected to a timer to generate a timeout signal in response to an enable signal, for controlling a series of send procedures to send a message requested to send from a processor via an output port; a buffer unit connected to the message send controller, for storing a control message, a data transfer information and a data; a local bus controller to connect the message send controller and the buffer device to a local bus, for controlling a transfer request and a transfer response for the local bus; and an output port controller connected to the message send controller and the buffer unit, for controlling an output port to send a packet to the interconnection network.

BRIEF DESCRIPTION OF THE DRAWINGS

For fuller understanding of the nature and object of the invention, reference should be had to the following detailed description taken in conjunction with the accompanying drawings in which:

FIG. 2 shows the configuration of a message send control apparatus according to the present invention.

Similar reference characters refer to similar parts in the several views of the drawings.

DESCRIPTION OF THE INVENTION

The present invention will be described in detail by reference to the accompanying drawings.

Figure 1:
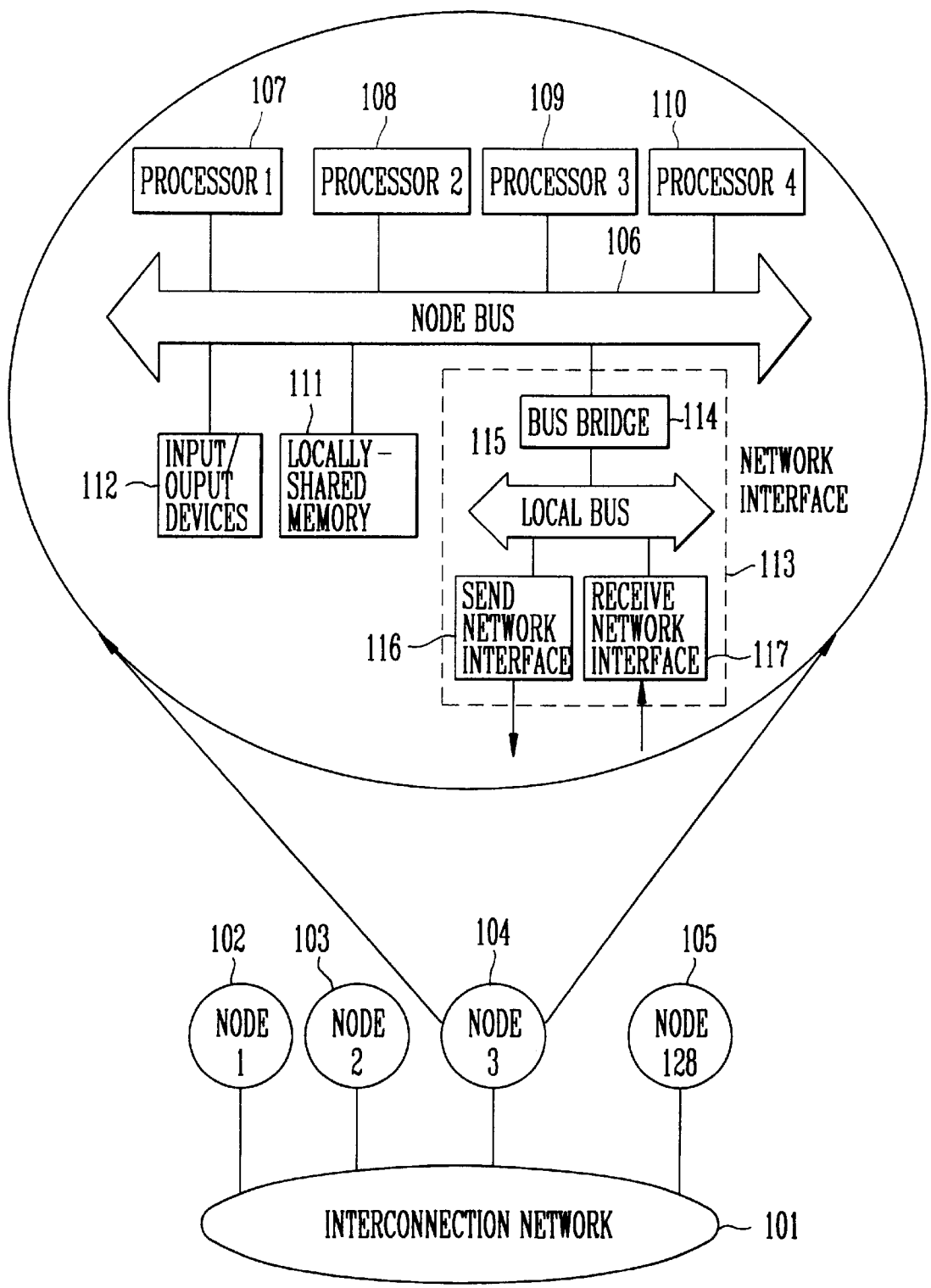
FIG. 1 shows configuration of nodes which are connected to an interconnection network applicable to the present invention.

FIG. 1 shows a computer system structure in which a plurality of nodes 102, 103, 104 and 105 are connected to an interconnection network 101. Each of the nodes 102, 103, 104 and 105 connected to the interconnection network 101 is constructed like an enlarged portion of FIG. 1. Each node includes minimum 1 to maximum 4 processors. Since each processor 107, 108, 109 and 110 is connected to a node bus 106, it forms a symmetric multiprocessor sharing a locally-shared memory 111. The input/output devices 112 are connected to the node bus 106, but the node which does not require any input/output does not include the input/output devices 112. A network interface 113, which is an apparatus connecting the node to the interconnection network, is connected to the input and output ports of the interconnection network. The network interface 113 has a structure in which a send network interface 116 and a receive network interface 117 are divided, each of which is connected to a local bus 115. A bus bridge 114 is responsible for an interface between the node bus 106 and the local bus 115. The send network interface 116 performs a series of operations to packetize the messages requested to send from the processor and then send them to the interconnection network via an output port. The receive network interface 117 performs a series of operations to de-packetize the packets arrived via an incoming port and restore the original message. The network interface 113 transfers two types of messages divided into a control message and a data message so as to support efficiently the message send between the nodes. The control message is used to transfer a control information between the nodes. The size of the control message is minimum 4 bytes to maximum 64 bytes and can be increased by a multiple of 4 bytes. The control message is transferred in a memory-mapped transfer method because its size relatively small and it is generated directly in the processor. The data message is used to transfer data in the locally-shared memory 111 to another node and consists of the combination of a data transfer information(called DTI thereinafter) and data. The DTI is the heading portion of the data message, which includes a transfer information on address and size of data to be sent. The size of the DTI is minimum 16 bytes to maximum 64 bytes and may be increased by a multiple of 4 bytes. The size of data is minimum 64 bytes, maximum 1 Mbytes and may be increased by a multiple of 64 bytes. The data message is transferred in a DMA-based transfer method because its size is relatively large and it is located in the locally-shared memory 111. The network interface 113 supports a point-to-point transfer and a broadcast transfer for the control message, and supports only a point-to-point transfer for the data message.

FIG. 2 shows a structure which a message send controller 202 is connected within the send network interface 116. The local bus controller 201 connects the message send controller 202 and the buffer unit 206 to the local bus 115 and controls a transfer request and a transfer response for the local bus. The message send controller 202 is the subject matter of the present invention and controls a series of send procedures to send the message requested to send from a processor via an output port. The message send controller 202 is connected to the local bus controller 201 and the buffer unit 206 and the output port controller 213 and the timer 214, and includes a message buffer control register 203 (called "MCR" thereinafter) to control a message send and a message transfer information register 204 (called MTIR thereinafter) and a data flag 205 (called DFLAG thereinafter). The MCR 203 is an 8-bit register to control the message buffer 207 and includes control and status information on the message buffer 207.

MTIR 204 is a 32-bit register which stores the foremost 4 bytes of the control message or the foremost 4 bytes of DTI, which are called message transfer information and are read from the message buffer 207 by the message send controller 202.

DFLAG 205 is a data flag of a 1-bit register. In case of sending a data message, DFLAG 205 represents that the data portion is now being sent after DTI is sent. The buffer unit 206 includes a message buffer 207 and a data buffer 208.

The message buffer 207 stores a control message or a DTI which are requested to send from a processor, and includes four buffers MB0 209, MB1 210, MB2 211 and MB3 212 of 64 bytes in size. The message buffer 207 is controlled by MCR 203. The data buffer 208 stores data which the local bus controller 201 reads from the locally-shared memory 111 in a DMA operation. The output port controller 213 controls the output port to send a packet to the interconnection network 101. If the timer 214 is enabled, a timeout signal is asserted after a determined time has elapsed and if it is disabled, the timeout signal is never asserted. In order to prevent an infinite waiting for a message receive acknowledge or infinite retries to send due to repeated transfer errors, the controller 202 first enables the timer 214 before sending a message. If the timeout signal is generated before the completion of message transfer, the message send controller 202 asserts a timeout interrupt to a processor.

Figure 3A:
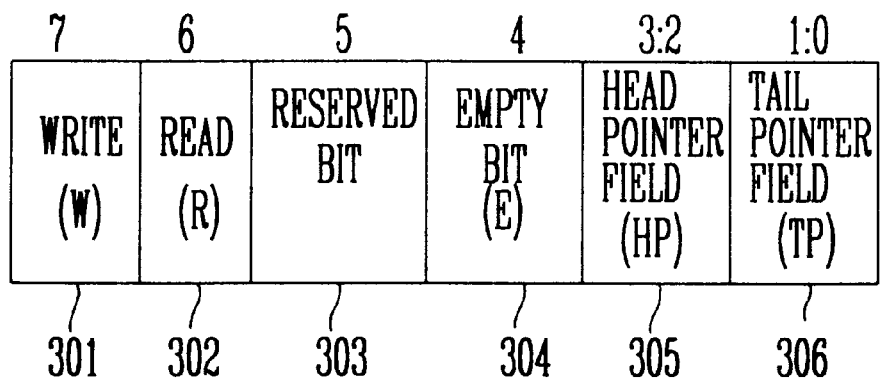
FIG. 3A and FIG. 3B are the configurations of registers for send control.
Figure 3B:
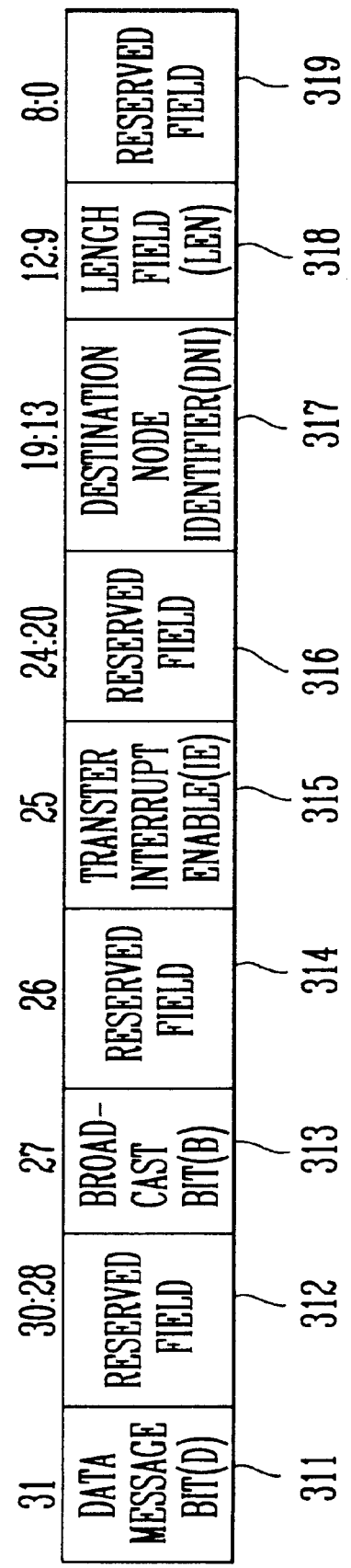

FIG. 3A and FIG. 3B are the configurations of registers MCR 203 and MTIR 204 for send control. MCR 203 can be read and written by a processor, and writable bits are a write (called "W" thereinafter) bit 301 and a read (called "R" thereinafter) bit 302. The W bit 301 is a bit representing a write operation of the message buffer 207. When an W bit 301 is 1, it represents that a processor performed a write operation and stored one control message or one DTI into the message buffer 207. The R bit 302 is a bit representing a read operation of the message buffer 207. When a R bit 302 is 1, it represents that a processor performed a read operation and read one control message or one DTI from the message buffer 207. An empty (called "E" thereinafter) bit 304 represents an empty state of the message buffer 207. When an E bit 304 is 1, it represents that all the message buffers 207 are empty.

MCR 203 makes four unit buffers MB0 209, MB1 210, MB2 211 and MB3 212 which consist of the message buffer 207 as a circular queue structure so as to control them. The circular queue is formed as four unit buffers 209, 210, 211 and 212, and is controlled to operate as a first-in first-out fashion. A Head Pointer (called "HP" thereinafter) field 305 represents a head pointer of the circular queue. When the value of HP field 305 is 0, MB0 209, when 1, MB1 210, when 2, MB2 211 and When 3, MB3 212, indicate heads of the circular queue. A Tail Pointer(called "TP" thereinafter) field 306 represents a tail pointer of the circular queue. When the value of TP field 306 is 0, MB0 209, when 1, MB1 210, when 2, MB2 211 and When 3, MB3 212, indicate tails of the circular queue. A reserved bit 303 indicates unused area. The value of this bit has no meaning and may be used in the future extension.

The circular queue operation of the message buffer 207 controlled by MCR 203 is as follows. The TP field 306, the tail pointer of the circular queue, indicates an empty unit buffer to be filled next, and the HP field 305, the head pointer, indicates a unit buffer to be read out and sent. When a processor 107, 108, 109 or 110 writes 1 into the W bit 301, the message send controller 202 increases the TP field 306 of the tail pointer by 1 and erases the W bit 301 to be 0 and then erases the E bit 304 to be 0. When one message sending is successfully completes and an interrupt assertion is not requested, the message send controller 202 increases the HP field 305 of the head pointer by 1. On the other hand, when a transfer interrupt or a timeout interrupt is asserted to a processor 107, 108, 109 or 110, the message send controller 202 increases the HP field 305 of the head pointer by 1 and erases the R bit 302 to be 0 after the processor writes 1 into the R bit 302. When the E bit 304 is 0 and simultaneously the HP field 305 of the head pointer and the TP field 306 of the tail pointer are same, it indicates that all the message buffers 207 are filled. When a processor executes a write operation into the W bit 301 or the R bit 302, they should write 1 into the one bit and write 0 into the other bit. That is, both of the two bits must not written into 1.

MTIR 204 may be neither read nor written by a processor. A Data Message (called "D" thereinafter) bit 301 is a bit representing whether a message to be sent is a control message or a data message. When the D bit 311 is 0, it indicates a control message, and when the D bit 311 is 1, it indicates a data message. A Broadcast (called "B" thereinafter) bit 313 is a bit representing a broadcast transfer. When the B bit 313 is 1, it sends the message to be sent to all the nodes connected to the interconnection network 101, and when the B bit 313 is 0, it sends the message to be sent to the node written into a Destination Node Identifier (called "DNI" thereinafter) field 317. A Transfer Interrupt Enable (called "IE" thereinafter) is a bit representing a transfer interrupt enable. When the IE bit 315 is 1, the message send controller 202 asserts a transfer interrupt to a processor when the message transfer is successful without fail.

The DNI field 317 is a destination node identifier, indicating the unique identifier of a destination node to which a message is to be sent. The computer system applicable to the present invention uses 7 bits as a node identifier so as to identify all the nodes, since maximum 128 nodes of which may be connected to the interconnection network. A Length (called "LEN" thereinafter) field 318 is a field indicating the length of a control message or a DTI to be sent, and the real length is four times of the value adding 1 to the LEN field 318. That is, it is (the value of LEN field+1)×4 bytes long. Reserved fields 312, 314, 316 and 319 are unused areas. The value of these fields has no meaning and may be used in the future extension.

Figure 4A:
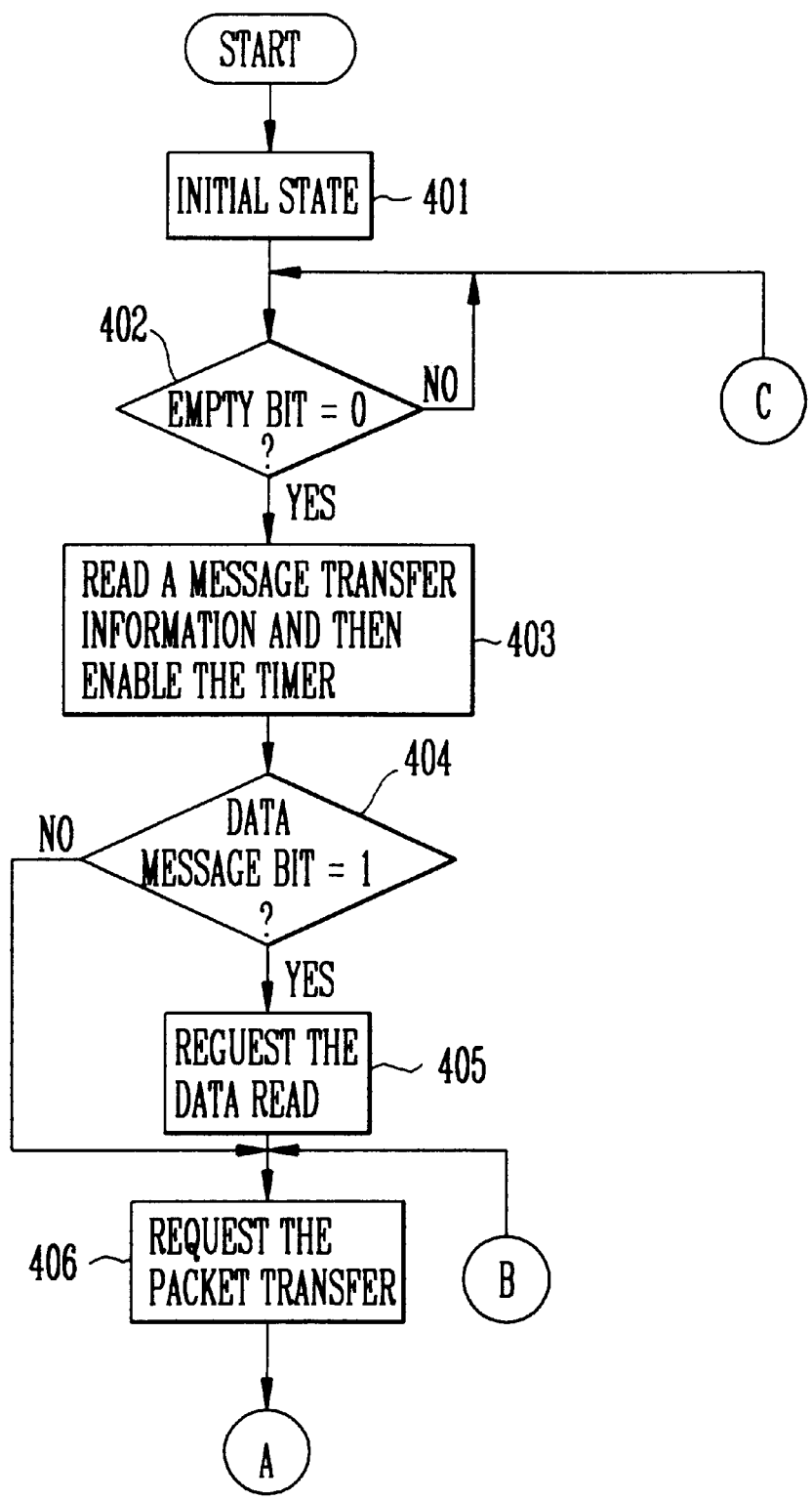
FIG. 4A, FIG. 4B, and FIG. 4C are flow charts showing a message send control method according to the present invention.
Figure 4B:
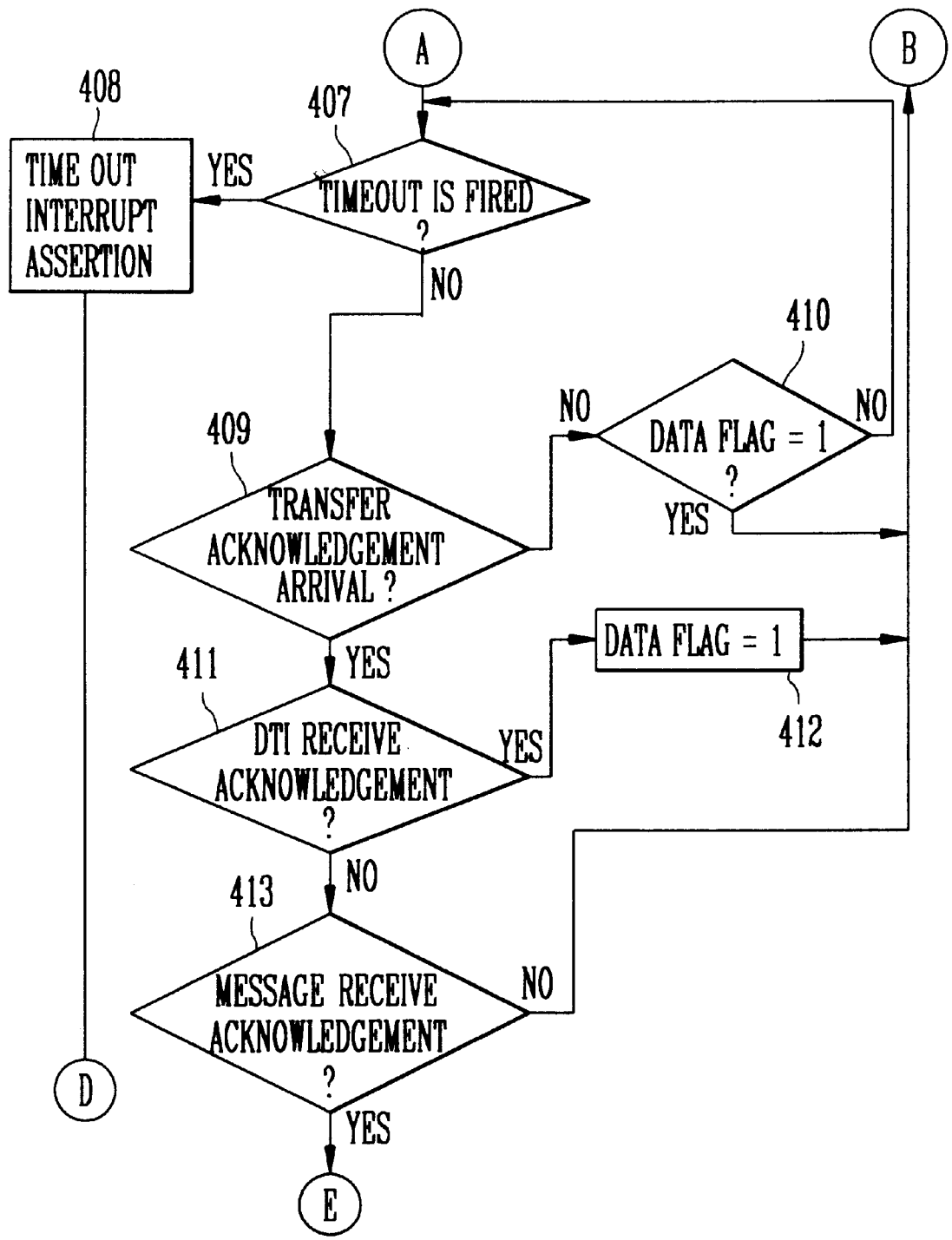

FIG. 4A and FIG. 4B are flow charts showing a message send control method according to the present invention, showing the procedure that the message send controller 202 sends a control message or a data message step by step.

First, the message send controller 202 is in an initial state 401 in which it is reset. When it becomes an initial state 401, all the bits of MCR 203 except for the E bit 304 and all the bits of MTIR 204 and the value of DFLAG 205 become 0 and the E bit 304 of MCR 203 becomes 1. When a processor requests for a message send, a message send is begun.

A processor reads MCR 203 to check whether the message buffer 207 is fully filled or not before executing a write operation into the message buffer 207 so as to send a message, and then if there is any available space in the message buffer 207 the processor writes a control message or a DTI to be sent into the message buffer 207. After executing a write operation into the message buffer 207, the processor executes a write operation into MCR 203 and sets W bit 301 to be 1. The control operation according to the setting of W bit 301 is shown in FIG. and be explained in later section.

When being an initial state 401, the message send controller 202 checks E bit 304 of MCR 203(402). If E bit 304 is not 0, the message send controller 202 repeats to check E bit 304, and if E bit 304 is 0, the message send controller 202 reads a message transfer information(the foremost 4 bytes of a control message or the foremost 4 bytes of a DTI) from the message buffer 207 and stores them into MTIR 204 and then enables the timer 214(403). After enabling the timer 214, the message send controller 202 checks D bit 311 of MTIR 204 (404). If D bit 311 is not 1, the process proceeds to a step 406, and, if D bit 311 is 1, the message send controller 202 requests the local bus controller 201 to read the data to be sent (405). The local bus controller 201 executes DMA operation to read the data requested by the message send controller 202 from the locally-shared memory 111 and then stores them in the data buffer 208. After requesting a data read to the local bus controller 201, the message send controller 202 requests the packet transfer to the output port controller 213(406). If DFLAG is 0, the output port controller 213 reads one control message or DTI from the message buffer 207 and then forms a packet to send it to the interconnection network 101.

On the other hand, if DFLAG is 1, the output port controller 213 reads data of 64 bytes from the data buffer 208 as they are ready and then forms a packet to send it to the interconnection network 101. After requesting the packet transfer to the output port controller 213, the message send controller 202 checks that a timeout has been fired from the timer 214(407). If the timeout has been fired, the message send controller 202 asserts a timeout interrupt to a processor (408) and then the process transits to step 416.

The processor that received the timeout interrupt can read a control message or a DTI from the message buffer 207 so as to confirm what message is related to the interrupt. Then the processor must execute a write operation into the MCR 203 and set the R bit 302 to be 1. At this time, if the R bit 302 has not been set 1, it is assumed that the message send procedure has not been completed. If a timeout has not been fired, the the message send controller 202 checks that a transfer acknowledgement has arrived from the destination node(409). After a transfer acknowledgement is arrived at the receive network interface 117 and then transferred to the local bus controller 201 in a source network interface 116 via the local bus 115, the local bus controller 201 notifies it to the message send controller 202.

If not transfer acknowledgement, the message send controller 202 checks DFLAG 205(410). If DFLAG 205 is 1, the process returns to step 406, and, if DFLAG 205 is 0, the process returns to step 407. If transfer acknowledgement, the message send controller 202 checks if it is a DTI receive acknowledgement(411). If DTI receive acknowledgement, the message send controller 202 sets DFLAG 205 to be 1(412) and then the process returns to step 406. If not DTI receive acknowledgement, the message send controller 202 checks if it is a message receive acknowledgement(413). If not message receive acknowledgement, the process returns to step 406 to retry the packet transfer since a transfer error has occurred. If a message receive acknowledgement, the message send controller 202 checks IE bit 315(414). If the IE bit 315 is not 1, the process transits to step 417. If the IE bit 315 is 1, the message send controller 202 asserts a transfer interrupt to a processor(415). The processor that received the transfer interrupt can read a control message or a DTI from the message buffer 207 so as to confirm what message is related to the interrupt. Then the processor must execute a write operation into the MCR 203 and set the R bit 302 to be 1. At this time, if the R bit 302 is not set 1, it is assumed that all the message send procedures have not been completed.

After asserting the transfer interrupt, the message send controller 202 checks the R bit 302(416). If the R bit 302 is not 1, the message send controller 202 repeats to check the R bit 302. If the R bit 302 is 1, the message send controller 202 erases DFALG 205 to be 0, increases the HP field 305 of the head pointer by 1, erases the R bit 302 to be 0 and disables the timer 214. Also a timer interrupt or a transfer interrupt is asserted, the message send controller 202 deasserts it(417). Then the message send controller 202 checks if the HP field 305 and the TP field 306 are identical(418). If the HP field 305 and the TP field 306 are identical, the message send controller 202 sets the E bit 304 to be 1(419) and then the process returns to step 402. If the HP field 305 and the TP field 306 are not identical, the process returns to step 402 immediately.

Figure 5:
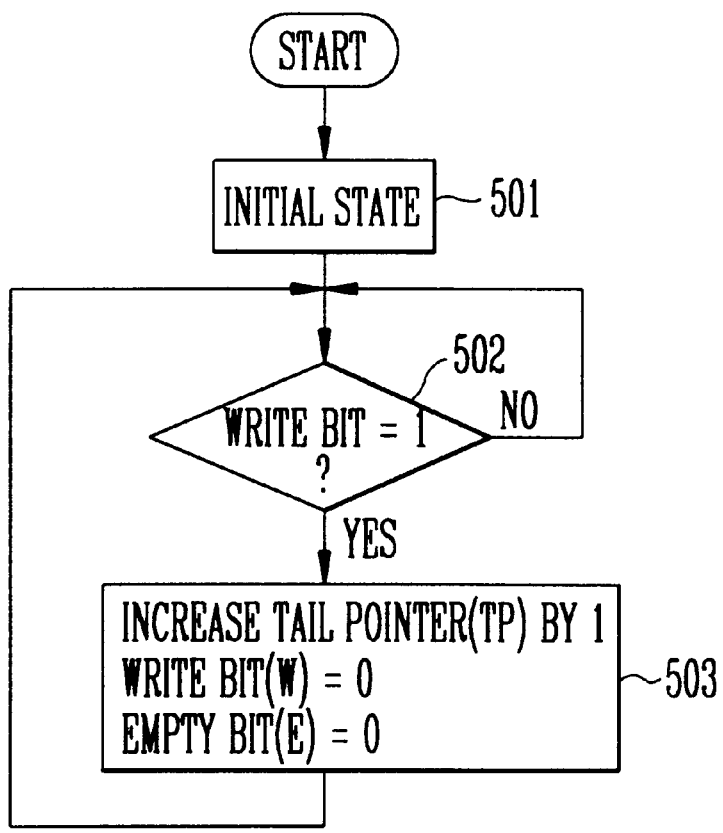
FIG. 5 is the flow chart of control operation on write bit setting according to the present invention.

FIG. 5 is a flow chart showing a control procedure according to the W bit setting. First, an initial state in which the message send controller 202 is reset(501). The initial state is the same as explained in step 401 in FIG. 4.

As explained above, in order to send a message, the processor first reads the MCR 203 before storing a control message or a DTI into the message buffer 207 so as to confirm whether the message buffer 207 has been fully filled or not. If there is any available space in the message buffer 207, the processor writes a control message or a DTI to be sent into the message buffer 207. Then in order to notify the message send controller 202 the fact that a message has been stored in the message buffer 207, the processor executes a write operation into the MCR 203 and sets the W bit 301 to be 1. After the initial state has been set, the message send controller 202 checks the W bit 301(502). If the W bit 301 is not 1, the processor repeats to check the W bit 301. If the W bit 301 is 1, the processor increases the TP field 306 of the tail pointer by 1, erases the W bit 301 to be 0 and erases the E bit 304 to be 0(503).

Figure 4C:
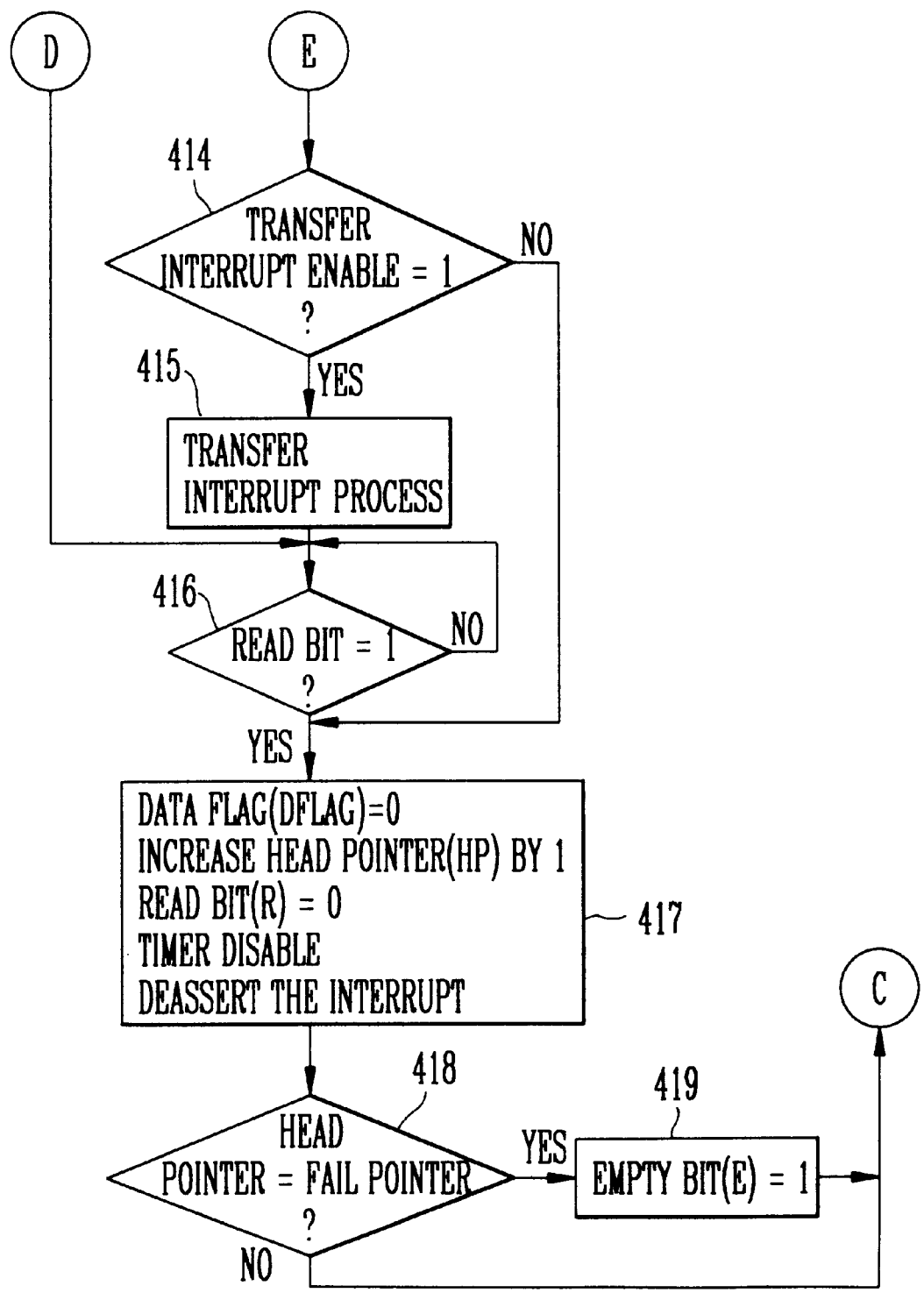

The control operation in accordance with the W bit 301 setting shown in FIG. 5 will be executed concurrently and independently of the message send operation shown in FIG. 4. As mentioned above, the present invention can maximize the transfer rate of message which makes it possible for the massage send controller to send a message independent of a message reception by separating the send and receive interfaces independently, and can minimize a message send overhead which executes all the send controls by integrating them in the message send controller without using an additional processor. In addition, the present invention has an outstanding effect which can provide a flexibility in usage by supporting both of the memory-mapped transfer and the DMA-based transfer and providing a function to designate selectively the transfer mode in a software program according to the message characteristics(message location, transfer amount, etc.).

The foregoing description, although described in its preferred embodiment with a certain degree of particularity, is only illustrative of the principles of the present invention. It is to be understood that the present invention is not to be limited to the preferred embodiments disclosed and illustrated herein. Accordingly, all expedient variations that may be made within the scope and spirit of the present invention are to be encompassed as further embodiments of the present invention.

What we claim:

1. A message transfer apparatus in a packet-switched interconnection network comprising:
   a message send controller controlling a send procedure in which a message requested by a processor is sent via an output port;
   a timer enabled by an output signal of said message send controller and generating a timeout signal;
   a buffer unit connected to said message send controller, said buffer unit comprising a message buffer and a data buffer;
   a local bus controller connecting said message send controller and said buffer unit to a local bus and controlling a transfer request and a transfer response to the local bus; and
   an output port controller connected to said message send controller and said buffer unit and controlling the output port which sends a packet to an interconnection network.

2. The message transfer apparatus in accordance with claims 1, wherein said message send controller comprises:
   a message buffer control register storing control and status information of the message buffer and controlling the message buffer in response to a message send request of the processor;
   a message transfer information register storing message transfer information and storing necessary portions of the control message and data transfer information to be sent, which is read from said message buffer; and a data flag indicating data which is currently being sent after sending the data transfer information when a data message is sent in response to a message send request of the processor.

3. The message transfer apparatus in accordance with claim 1, wherein said buffer unit comprises:

a message buffer including four buffers and storing one of a control message and data transfer information requested by the processor; and a data buffer for storing data read from a locally-shared memory by a direct memory access operation of said local bus controller.

* * * * *